(12) United States Patent
Peters et al.

(10) Patent No.: US 12,002,369 B2
(45) Date of Patent: Jun. 4, 2024

(54) GRAPHICAL USER INTERFACE (GUI) FOR SELECTION AND DISPLAY OF ENROUTE CHARTS IN AN AVIONICS CHART DISPLAY SYSTEM

(71) Applicant: Rockwell Collins, Inc., Cedar Rapids, IA (US)

(72) Inventors: Kyle R. Peters, Ely, IA (US); Jeff M. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 259 days.

(21) Appl. No.: 17/525,067

(22) Filed: Nov. 12, 2021

(65) Prior Publication Data

US 2023/0154341 A1     May 18, 2023

Related U.S. Application Data

(60) Provisional application No. 63/278,576, filed on Nov. 12, 2021.

(51) Int. Cl.
*G06F 3/0482*     (2013.01)
*G06F 3/04842*     (2022.01)
*G08G 5/00*     (2006.01)

(52) U.S. Cl.
CPC ......... *G08G 5/0047* (2013.01); *G06F 3/0482* (2013.01); *G06F 3/04842* (2013.01); *G08G 5/0021* (2013.01)

(58) Field of Classification Search
CPC .. G08G 5/0047; G08G 5/0021; G06F 3/0482; G06F 3/04842
See application file for complete search history.

(56) References Cited

U.S. PATENT DOCUMENTS 3,522,586 A    8/1970   Kiji et al.
3,656,178 A    4/1972   Maine et al.
(Continued)

FOREIGN PATENT DOCUMENTS

CA     3095088 C    2/2021
CN     1045835 C    10/1999
(Continued)

OTHER PUBLICATIONS

Extended European Search Report dated Apr. 11, 2023; European Application No. 22207049.2.
(Continued)

*Primary Examiner* — Anil K Bhargava
(74) *Attorney, Agent, or Firm* — Suiter Swantz IP (57) ABSTRACT

An aircraft-based display system providing a graphical user interface (GUI) for display of terminal charts further displays an enroute selector for engagement to select and display enroute charts. Engagement with the enroute selector brings up an enroute menu for selecting for display enroute charts associated with the ownship position or previously selected enroute charts; selection of an enroute chart 1) makes the selected chart the new active enroute chart and 2) displays the enroute chart. Each chart in the enroute menu includes a play button; engagement with the play button brings up an enroute selector GUI allowing selection of an enroute region and chart type. The enroute selector GUI displays all available enroute charts for a selected region and chart type, allowing the selection and display of the desired enroute chart in graphical as well as textual format.

20 Claims, 5 Drawing Sheets

(56) References Cited

U.S. PATENT DOCUMENTS

| | | | |
|---|---|---|---|
| 4,096,527 A | 6/1978 | Furuta | |
| 4,736,303 A | 4/1988 | Itoh et al. | |
| 4,792,981 A | 12/1988 | Cahill, III et al. | |
| 4,876,651 A | 10/1989 | Dawson et al. | |
| 5,050,230 A | 9/1991 | Jones et al. | |
| 5,428,692 A | 6/1995 | Kuehl | |
| 5,454,076 A | 9/1995 | Cain et al. | |
| 5,499,382 A | 3/1996 | Nusinov et al. | |
| 5,537,669 A | 7/1996 | Evans et al. | |
| 5,546,572 A | 8/1996 | Seto et al. | |
| 5,559,707 A * | 9/1996 | DeLorme | G01C 21/3688 701/426 |
| 5,577,170 A | 11/1996 | Karow | |
| 5,936,637 A | 8/1999 | Seto | |
| 5,978,715 A | 11/1999 | Briffe et al. | |
| 6,014,133 A | 1/2000 | Yamakado et al. | |
| 6,240,341 B1 | 5/2001 | Snyder | |
| 6,275,610 B1 | 8/2001 | Hall, Jr. et al. | |
| 6,320,984 B1 | 11/2001 | Shigeta | |
| 6,448,922 B1 | 9/2002 | Kelly | |
| 6,501,441 B1 | 12/2002 | Ludtke et al. | |
| 6,839,714 B2 | 1/2005 | Wheeler et al. | |
| 7,039,505 B1 | 5/2006 | Southard et al. | |
| 7,096,211 B2 | 8/2006 | Fujihara | |
| 7,173,738 B2 | 2/2007 | Kohn | |
| 7,552,010 B2 | 6/2009 | Saito | |
| 7,552,011 B2 | 6/2009 | Ishii et al. | |
| 7,562,289 B2 | 7/2009 | Bufkin et al. | |
| 7,581,036 B2 | 8/2009 | Powell et al. | |
| 7,609,263 B2 | 10/2009 | Nagasaki et al. | |
| 7,739,622 B2 | 6/2010 | DeLine et al. | |
| 7,777,749 B2 | 8/2010 | Chung et al. | |
| 7,948,502 B2 | 5/2011 | Stanton | |
| 7,966,609 B2 | 6/2011 | Serebryany | |
| 8,035,642 B2 | 10/2011 | Suzuki | |
| 8,165,732 B2 | 4/2012 | Corbefin et al. | |
| 8,169,505 B2 | 5/2012 | Hoshi | |
| 8,306,745 B1 | 11/2012 | Clark et al. | |
| 8,339,417 B2 | 12/2012 | Stroila et al. | |
| 8,374,390 B2 | 2/2013 | Stroila et al. | |
| 8,379,065 B2 | 2/2013 | Nam et al. | |
| 8,515,658 B1 | 8/2013 | Foster et al. | |
| 8,583,368 B1 * | 11/2013 | Sindlinger | G01C 23/00 701/460 |
| 8,704,732 B2 | 4/2014 | Pourbigharaz et al. | |
| 8,937,737 B2 | 1/2015 | Tsutsumi et al. | |
| 9,035,969 B2 | 5/2015 | Ivashin et al. | |
| 9,195,637 B2 | 11/2015 | Peraza et al. | |
| 9,430,195 B1 | 8/2016 | Pecoraro et al. | |
| 9,443,433 B1 | 9/2016 | Conway et al. | |
| 9,465,513 B2 * | 10/2016 | Sims | G06F 16/29 |
| 9,489,121 B2 | 11/2016 | Davis et al. | |
| 9,547,727 B2 | 1/2017 | Passani et al. | |
| 9,619,919 B1 | 4/2017 | Postnikov et al. | |
| 9,639,309 B1 | 5/2017 | Pugh | |
| 9,671,935 B2 | 6/2017 | Miichi et al. | |
| 9,703,455 B2 | 7/2017 | Cocco et al. | |
| 9,781,294 B1 | 10/2017 | Chapman | |
| 9,818,051 B2 | 11/2017 | Panek et al. | |
| 9,858,823 B1 * | 1/2018 | Lynn | G07C 5/085 |
| 9,891,875 B2 | 2/2018 | Kim et al. | |
| 9,921,721 B2 | 3/2018 | Beavers et al. | |
| 9,939,271 B1 | 4/2018 | Foster et al. | |
| 10,001,376 B1 | 6/2018 | Tiana et al. | |
| 10,061,480 B1 | 8/2018 | McCusker et al. | |
| 10,170,010 B1 * | 1/2019 | McCusker | G08G 5/0021 |
| 10,372,292 B2 | 8/2019 | Vogel et al. | |
| 10,674,075 B2 | 6/2020 | Kimura | |
| 10,684,769 B2 | 6/2020 | Yamat et al. | |
| 10,872,274 B2 | 12/2020 | Mao et al. | |
| 10,880,522 B2 | 12/2020 | McCutchen et al. | |
| 10,984,501 B2 | 4/2021 | Milan et al. | |
| 11,030,477 B2 | 6/2021 | Becker et al. | |
| 11,061,563 B1 * | 7/2021 | Nielsen | G08G 5/0052 |
| 11,106,329 B2 | 8/2021 | He et al. | |
| 2003/0151630 A1 | 8/2003 | Kellman et al. | |
| 2004/0071351 A1 | 4/2004 | Rade | |
| 2004/0225440 A1 | 11/2004 | Khatwa et al. | |
| 2005/0030321 A1 | 2/2005 | Anwar | |
| 2005/0091340 A1 | 4/2005 | Facemire et al. | |
| 2006/0031006 A1 | 2/2006 | Stenbock et al. | |
| 2006/0215915 A1 | 9/2006 | Kim | |
| 2007/0067095 A1 | 3/2007 | King | |
| 2007/0094591 A1 | 4/2007 | Etgen et al. | |
| 2007/0112517 A1 | 5/2007 | Goldstein | |
| 2007/0185651 A1 | 8/2007 | Motoyama et al. | |
| 2008/0046254 A1 | 2/2008 | Nuno et al. | |
| 2008/0103641 A1 | 5/2008 | Ratcliffe | |
| 2008/0240152 A1 | 10/2008 | Quinn et al. | |
| 2009/0080801 A1 | 3/2009 | Hatfield et al. | |
| 2009/0123070 A1 | 5/2009 | Xiaoying | |
| 2009/0125837 A1 | 5/2009 | Hatem et al. | |
| 2009/0324065 A1 | 12/2009 | Ishida et al. | |
| 2010/0128020 A1 | 5/2010 | Oh et al. | |
| 2010/0218089 A1 | 8/2010 | Chao et al. | |
| 2010/0262318 A1 * | 10/2010 | Ariens | G08G 5/0021 701/3 |
| 2010/0328353 A1 | 12/2010 | McDonald et al. | |
| 2011/0191014 A1 | 8/2011 | Feng et al. | |
| 2012/0019673 A1 | 1/2012 | Narayanan | |
| 2012/0242687 A1 | 9/2012 | Choi | |
| 2012/0287151 A1 | 11/2012 | James et al. | |
| 2014/0168277 A1 | 6/2014 | Ashley et al. | |
| 2014/0225928 A1 | 8/2014 | Konnola et al. | |
| 2014/0282038 A1 | 9/2014 | Royster et al. | |
| 2015/0070373 A1 | 3/2015 | Clinton | |
| 2015/0239574 A1 | 8/2015 | Ball et al. | |
| 2015/0278626 A1 | 10/2015 | Nakamura | |
| 2015/0324088 A1 | 11/2015 | Pasetto et al. | |
| 2016/0092557 A1 | 3/2016 | Stojanovic et al. | |
| 2017/0262413 A1 | 9/2017 | Song et al. | |
| 2017/0299633 A1 | 10/2017 | Pietrowicz et al. | |
| 2017/0313332 A1 | 11/2017 | Paget et al. | |
| 2018/0181646 A1 | 6/2018 | Balasa et al. | |
| 2018/0253889 A1 | 9/2018 | Nagasaka | |
| 2019/0057671 A1 | 2/2019 | Baer et al. | |
| 2019/0220234 A1 | 7/2019 | Lewis et al. | |
| 2019/0237043 A1 | 8/2019 | Tahmasebi | |
| 2019/0299701 A1 | 10/2019 | Bartels | |
| 2020/0089694 A1 * | 3/2020 | Cabra | G06T 17/05 |
| 2020/0195924 A1 | 6/2020 | Hsiang | |
| 2020/0251029 A1 | 8/2020 | Tseng | |
| 2020/0255350 A1 | 8/2020 | Baek | |
| 2020/0320142 A1 | 10/2020 | Malak et al. | |
| 2020/0386567 A1 | 12/2020 | Igarashi | |
| 2021/0004930 A1 | 1/2021 | Kamath et al. | |
| 2021/0035453 A1 | 2/2021 | Khan et al. | |
| 2021/0056309 A1 | 2/2021 | Chitta et al. | |
| 2021/0192202 A1 | 6/2021 | Tripuraneni et al. | |
| 2021/0225181 A1 | 7/2021 | Feyereisen et al. | |
| 2021/0349615 A1 | 11/2021 | Ruby et al. | |
| 2023/0154338 A1 * | 5/2023 | Henry | G01C 23/00 701/3 |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A2 | 9/2004 |
| EP | 1272977 B1 | 12/2004 |
| EP | 1687777 A2 | 8/2006 |
| EP | 2224359 A2 | 9/2010 |

(56) References Cited

FOREIGN PATENT DOCUMENTS

| | | | |
|---|---|---|---|
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3538978 A4 | 8/2020 |
| EP | 3845862 A1 | 7/2021 |
| GB | 2504085 A | 1/2014 |
| JP | S622721 A | 1/1987 |
| JP | S62196772 A | 8/1987 |
| JP | S6393273 A | 4/1988 |
| JP | H05205069 A | 8/1993 |
| JP | 3871040 B2 | 1/2007 |
| JP | 2007133231 A | 5/2007 |
| JP | 2008022215 A | 1/2008 |
| JP | 2009282855 A | 12/2009 |
| JP | 4728744 B2 | 7/2011 |
| WO | 9523364 A2 | 8/1995 |
| WO | 1998043208 A3 | 1/1999 |
| WO | 2011036499 A1 | 3/2011 |
| WO | 2014146561 A1 | 9/2014 |
| WO | 2021035223 A1 | 2/2021 |
| WO | 2021035954 A1 | 3/2021 |

OTHER PUBLICATIONS

Extended European Search Report dated Apr. 4, 2023; European Application No. 22207012.0.
Extended European Search Report dated Apr. 5, 2023; European Application No. 22207019.5.
Hatlapatka Radim: "JBIG2 Supported by OCR", EUDML Jul. 9, 2012, pp. 1-9.
Shang Junqing et al: "JBIG2 text image compression based on OCR", Proceedings of the SPIE, vol. 6067, Jan. 15, 2006, p. 6067D.
ArcGIS, "Introduction to export a map or layout", retrieved from the Internet Nov. 11, 2021.
Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.
Houston, Ben & Nielsen, Michael & Batty, Christopher & Nilsson, Ola & Museth, Ken. (2006). Hierarchical RLE Level Set: A compact and versatile deformable surface representation. ACM Trans. Graph .. 25. 151-175.
Jeppesen, "JeppView for Windows, User Guide", (2016), 92 pages.
Lufthanasa Systems Blog, "Lido eRouteManual 4.3 Design Overview", (2016) Retrieved from the Internet.
Maptiler, "Software performs Geocoding, Place name search, and Reverse Geocoding." Retrieved from Internet on Nov. 11, 2021.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Navigraph, "Navigraph Charts", Retrieved from the Internet.
Pamental, Jason, "Digging in to dynamic typography", Retrieved from Internet , Nov. 11, 2021, 11 pages.
Pamental, Jason, "The evolution of typography with variable fonts", Retrieved from the Internet , Nov. 11, 2021.
Penquerch, "[AD] RLE clipping speedup patch" (2002), Retrieved from Internet , Nov. 11, 2021.
QGIS: Open-source cross-platform GIS software, Retrieved from Internet , Nov. 11, 2021.
Somasundaram, K. "A Method for Filling Holes in Objects of Medical Images Using Region Labeling and Run Length Encoding Schemes." (2010).
Anonymous: "Pilot's Guide to Foreflight Mobile 82nd Edition Covers ForeFlight Mobile v12.7", Aug. 26, 2020, pp. 161-165.
Anonymous: Pilot's Guide to Foreflight Mobile 82nd Edition Covers ForeFlight Mobile v12.7, Aug. 26, 2020, pp. 78-90.
Extended European Search Report dated Apr. 5, 2023, European Application No. 22207025.2.
Extended European Search Report dated Apr. 5, 2023, European Application No. 22207047.6.
Extended European Search Report dated Apr. 5, 2023; European Application No. 22207057.5.
Seo et al., "Fast Contour-Tracing Algorithm Based on a Pixel-Following Method for Image Sensors", Sensors, MPDI (Year: 2016).
Extended European Search Report dated Mar. 24, 2023; European Application No. 22207029.4.
Anonymous: "algorithm-Contour of a run-length-coded digital shape", Stack Overflow, Dec. 31, 2015, pp. 1-5, URL:https://stackoverflow.com/questions/32354807/contour-of-a-run-length-coded-digital-shape.
Extended European Search Report dated Apr. 21, 2023; European Application No. 22207060.9.
Extended European Search Report dated Jun. 13, 2023; European Application No. 22206954.4.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al, "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitude Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.

* cited by examiner

GRAPHICAL USER INTERFACE (GUI) FOR SELECTION AND DISPLAY OF ENROUTE CHARTS IN AN AVIONICS CHART DISPLAY SYSTEM

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/278,576 entitled SYSTEMS AND METHODS FOR GENERATION, SELECTION, AND DISPLAY OF MAP-BASED CHART DATABASES FOR USE WITH CERTIFIED AVIONICS SYSTEMS and filed Nov. 12, 2021; and Concurrently filed U.S. patent application Ser. No. 17/525,130 entitled SYSTEM AND METHOD FOR ENHANCING SITUATIONAL AWARENESS VIA PANEL SELECTOR DISPLAY WHILE VIEWING MULTIPANEL AVIONICS CHARTS.

Said U.S. Patent Applications 63/278,576 and Ser. No. 17/525,130 are herein incorporated by reference in their entirety.

BACKGROUND

Aeronautical charts are an essential navigational reference for pilots, traditionally propagated as foldable paper charts. For example, terminal charts provide navigational reference for pilots operating under Visual Flight Rules (VFR) and/or Instrument Flight Rules (IFR); in particular, terminal charts provide geographical information (e.g., landmarks, populated places, facilities, terrain elevations, natural features, airspace boundaries) as well as operating information (e.g., approach/departure procedures) for the Class B airspace surrounding major airports. Increasingly, terminal charts are being displayed electronically, e.g., via electronic flight bags (EFB) or other like cockpit display devices. However, these conventional EFB devices may not be able to provide the same level of functionality for enroute charts, which provide navigational information for pilots operating under IFR (and, e.g., who may not be proximate to an originating or destination airport). For example, enroute charts eschew visual landmarks and terrain features for details about fixes and beacons; waypoints and airways; minimum altitudes; and other navigational/radionavigational aids between airports. Enroute charts may be classified as high-altitude or low-altitude, e.g., based on navigational aids for aircraft above or below a transitional altitude (e.g., FL 180 (Flight Level 180, or 18,000 feet)). Enroute charts may additionally include high/low ("hi-lo") providing a combination of high-altitude and low-altitude navigational aids, as well as area charts showing congested terminal areas at a large scale.

SUMMARY

An aircraft-based display system configured for display of a graphical user interface (GUI) associated with the display of avionics charts (e.g., terminal charts, enroute charts) is disclosed. In embodiments, the display system displays within the GUI an enroute selector configured for engagement by a pilot, operator, or other user of the display system. In response to user engagement with the enroute selector, the display system displays within the GUI an enroute menu of enroute charts selectable by a user, the enroute menu including enroute charts previously selected by the user. Each enroute chart comprises a sequence of component panels and includes a play button in the enroute menu; the user may select an enroute chart from the enroute menu, designating the selected chart as the active chart and displaying the active chart. In response to user engagement with the play button, the display system displays within the GUI an enroute selection menu including drop-down menus for user selection of a geographic region and/or a chart type (e.g., high-altitude, low-altitude, high/low). The enroute selection menu includes a selection list of all enroute charts of a selected chart type in a selected region, each listed enroute chart selectable by the user. The enroute selection menu includes a visual graphic display showing enroute charts of the selected chart type within the selected region.

In some embodiments, the display system displays within the GUI an ownship indicator showing the position of the aircraft relative to the visual graphic display.

In some embodiments, the display system displays within the GUI a non-displayable ownship indicator showing that the position of the aircraft cannot be displayed within the visual graphic display.

In some embodiments, the enroute selection menu includes identifiers for the active enroute chart and/or the active panel (e.g., currently selected, currently displayed, last displayed) of the active enroute chart.

In some embodiments, the enroute menu includes listed enroute charts corresponding to the ownship position, e.g., the current position of the aircraft.

In some embodiments, the listed current-position enroute charts including an indicator of the specific panel within the current-position enroute chart corresponding to the ownship position.

In some embodiments, the enroute menu includes an indicator of the active panel of each listed enroute chart; if a listed enroute chart is selected from the enroute menu, the currently active panel is displayed.

In some embodiments, the active panel of an enroute chart is the most recently displayed, or last displayed, panel.

In some embodiments, the enroute menu includes listed enroute charts not previously displayed and therefore not associated with an active panel; the listed enroute chart may indicate that there is not yet an active panel for that chart.

In some embodiments, the display system displays within the GUI a panel selector toggle configured for user engagement. In response to user engagement, a panel selector display will be activated or deactivated, the panel selector display configured for selecting an active panel of the active enroute chart.

In embodiments, the panel selector display includes a thumbnail display superimposed over the displayed active enroute chart (or, e.g., the currently displayed active panel thereof) and showing the full active enroute chart divided into its component panels, indicating the current active panel.

In some embodiments, the display system accepts control input from the user and, in response to the control input, highlights or selects an active enroute chart from the visual graphic display.

In some embodiments, the selection list of the enroute selection menu includes scroll controls and a cursor for selecting the active enroute chart.

In some embodiments, the enroute selection menu indicates if an active enroute chart is out of date.

In a further aspect, a method for selection and display of enroute charts within a GUI for chart display is also disclosed. In embodiments, the method includes displaying (e.g., via an aircraft-based display system configured for providing a GUI for the selection and display of avionics charts) an enroute selector configured for engagement by a pilot, operator, or other user of the aircraft display system. The method includes, in response to engagement with the enroute selector by the user, displaying within the GUI an enroute menu listing enroute charts for selection by the user, each enroute chart comprising a sequence of component panels and including a play button, the enroute menu including charts previously selected by the user. The method includes, in response to a selection by the user of an enroute chart via the enroute menu, designating the selected chart as the active enroute chart and displaying the selected active enroute chart. The method includes, in response to engagement by the user with the play button, displaying within the GUI an enroute selection menu including: drop-down menus for the selection of a geographic region and a chart type; a visual graphic display for graphically depicting the selectable enroute charts of a selected type within a selected region; and a selection list for listing the selectable enroute charts of the selected type and region.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to expanding the user interface for displaying terminal charts via electronic flight bag (EFB) or other flight displays to provide for the selection and display of enroute charts, which are associated with different characteristics than terminal charts. For example, while the look and feel of the GUI remains consistent, the enroute selection GUI may provide enhanced graphical information to simplify the selection and display of desired enroute charts. Further, the selection and display of enroute charts is provided with enhanced context and situational awareness; allowing for graphical enroute chart selection in addition to textual chart selection.

Figure 1:
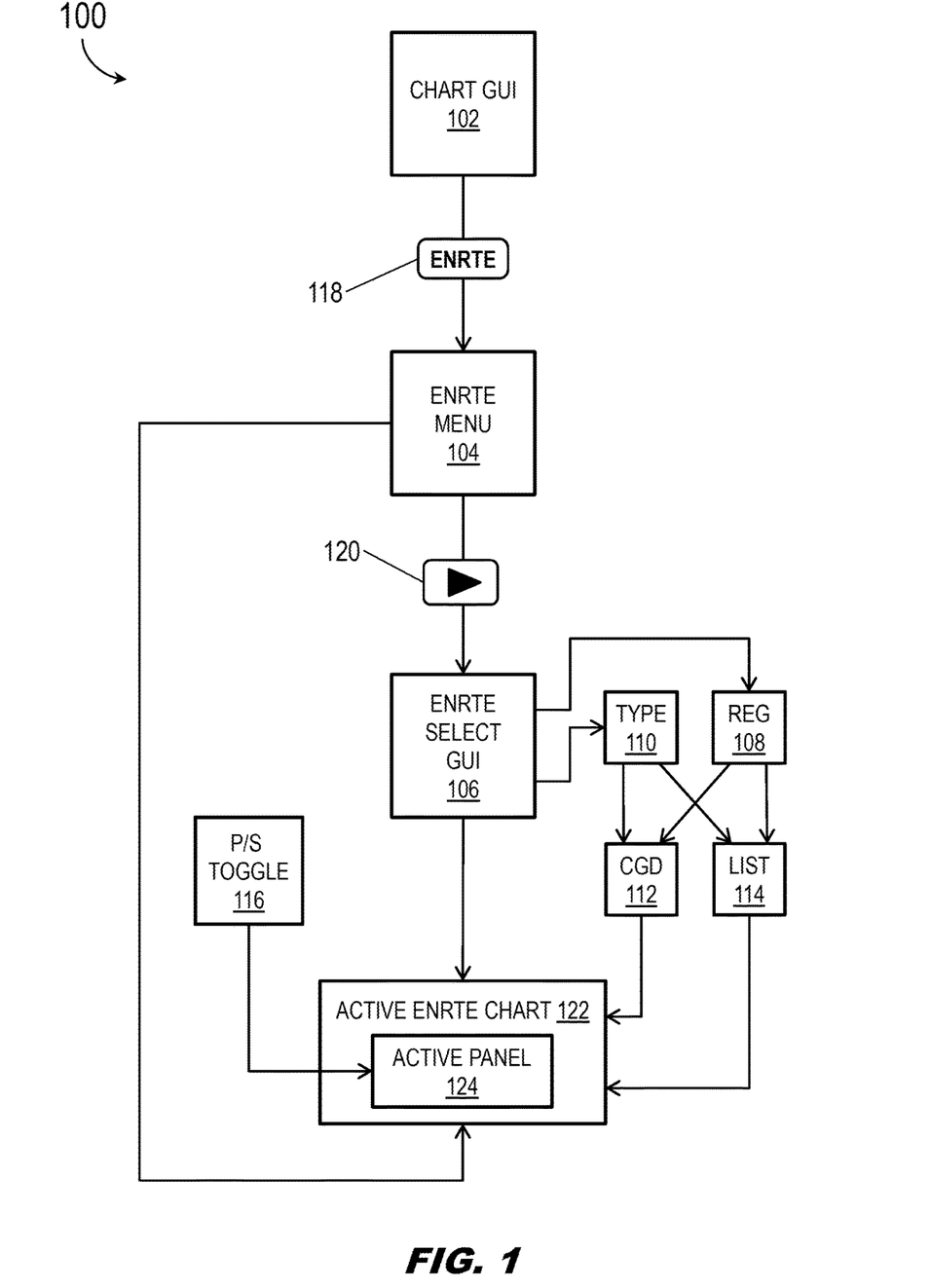
FIG. 1 is a block diagram illustrating a display system configured for display of avionics charts according to example embodiments of this disclosure.

Referring to FIG. 1, a display system 100 for displaying avionics charts (e.g., aeronautical charts) is shown. The display system 100 may include graphical user interface (GUI) 102, main enroute menu 104, enroute selection GUI 106, enroute region selector 108, enroute chart type selector 110, chart graphic display 112, chart selection list 114, and panel selector toggle 116. In embodiments, the display system 100 may be a cockpit display, e.g., primary flight display (PFD), navigational display, electronic flight bag (EFB), or any other display configured for navigation of an aircraft (e.g., ownship) and incorporating a display unit, data storage, and graphics generation processors.

In embodiments, the GUI 102 for selection and display of terminal charts may include an enroute (ENRTE) selector 118 configured for engagement by a user of the GUI (e.g., a pilot or operator). For example, engagement of the enroute selector 118 by the user may cause the GUI to display the main enroute menu 104, via which the user may be offered several options for selecting an enroute chart for display. In embodiments, each enroute chart listed by the main enroute menu 104 may allow the user to select that enroute chart for display, and may further include a play button 120 via which the user may engage with that particular enroute chart. For example, if the user selects a listed enroute chart for display, that enroute chart is displayed (e.g., and designated the active enroute chart 122).

In some embodiments, each enroute chart may be divided into a sequence of panels. For example, enroute charts may be too large to display at once (e.g., particularly within a flight display or EFB) such that a user may make effective use of the geographical information set contained within the enroute chart (e.g., natural features, manmade landmarks and facilities, potential obstructions, navigational and radio-navigational aids). Accordingly, in embodiments enroute charts may be divided into a sequence of panels such that when an enroute chart is selected for display, only a particular panel of the selected enroute chart is displayed in detail. For example, if the selected enroute chart has previously been displayed by the user, the most recently displayed panel of the selected enroute chart may remain the active panel to be displayed if that enroute chart is selected. If, however, a selected enroute chart has not yet been displayed, no active panel may be associated with that enroute chart, and thus the display system 100 may select (e.g., according to software logic) an active panel of the selected enroute chart for display.

In embodiments, engagement with any enroute chart listed by the main enroute menu 104 may cause the GUI 102 to display the selected enroute chart (specifically, an active panel of the selected enroute chart) while engagement with a play button 120 may cause the GUI 102 to display the enroute selection GUI 106. The enroute selection GUI 106 may allow the user to select a geographic region via the enroute region selector 108 and select a chart type via the enroute chart type selector 110. For example, as described in greater detail below, enroute charts may be grouped by the geographic region they collectively portray. Similarly, more than one type of enroute chart (e.g., high-altitude, low-altitude, high/low, area) may be associated with a given region, e.g., if the region in question (or portions thereof) include both high-altitude and low-altitude navigational aids. In embodiments, selection of a geographic region and chart type may configure the chart graphic display 112 and chart selection list 114 to allow selection by the user of all charts associated with a particular region and chart type, respectively by graphic or textual means.

In embodiments, the enroute selection GUI 106 may allow the user to activate or deactivate the panel selector toggle 116, e.g., toggling a panel selector display on or off. For example, the panel selector display may provide enhanced situational awareness by showing the currently displayed active panel 124 of the current active enroute chart 122 in the context of its associated enroute chart as a whole, and by allowing the user to select a different or new component panel of the active enroute chart for display. The panel selector toggle 116 and panel selector display are described in greater detail by concurrently filed patent application Ser. No. 17/525,130, which application is herein incorporated by reference in its entirety.

Figure 2:
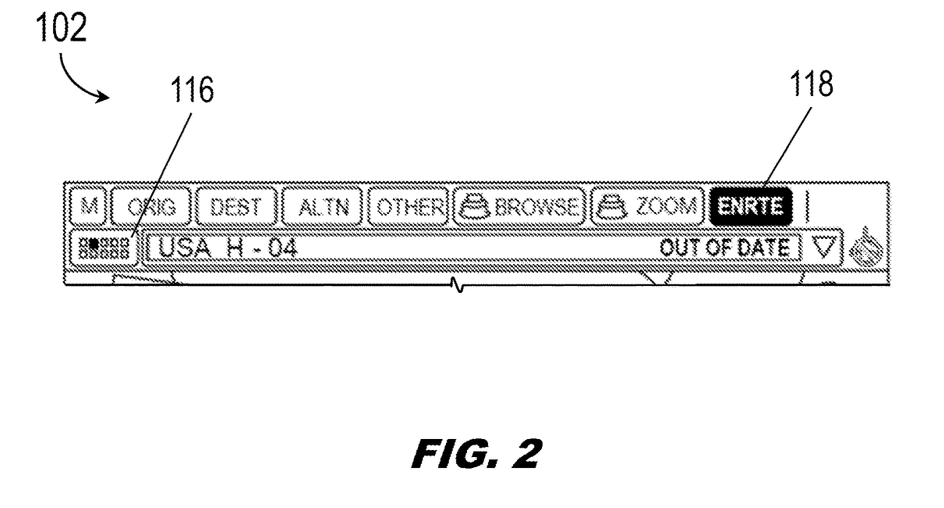
FIG. 2 is a partial view of a graphical user interface (GUI) for displaying terminal charts of the display system of FIG. 1.

Referring to FIG. 2, the terminal chart GUI 102 is shown.

In embodiments, the enroute selector 118 may be implemented as an enroute selection button (e.g., labeled with ENRTE, ENR, or any other appropriately descriptive text or icon/s). For example, pressing or otherwise engaging with the enroute selector 118 (e.g., via keyboard, keypad, peripheral device, cursor, mouse, trackball, direct contact with a touchscreen surface on which the terminal chart GUI 102 is displayed, or any other appropriate input device of the display system (100, FIG. 1)) may cause the terminal chart GUI 102 to display the main enroute menu (104, FIG. 1). Similarly, in embodiments the panel selector toggle 116 may be implemented as a button with which the user may engage to toggle the panel selector display on or off, as described in greater detail below.

Figure 3:
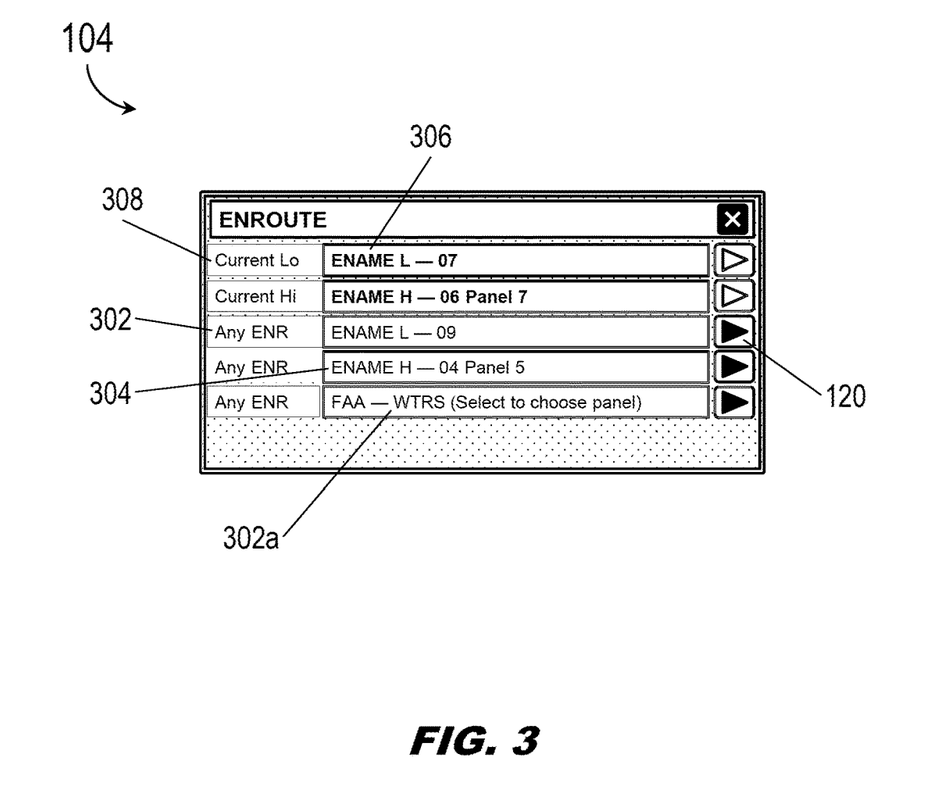
FIG. 3 is an illustration of a main enroute menu of the display system of FIG. 1.

Referring also to FIG. 3, the main enroute menu 104 is shown.

In embodiments, the main enroute menu 104 may present candidate enroute charts for selection by the user (and display to the user). For example, the main enroute menu 104 may display (e.g., under the heading "Any ENR", meaning "any enroute", or any other appropriate textual or iconic description indicating no relationship between the enroute chart and the current position of the aircraft) one or more candidate enroute charts 304 listed by name (e.g., high altitude charts H—06, H—04, low altitude charts L—07, L—09).

In some embodiments, the main enroute menu 104 may include current position enroute charts 306 listed under headings 308 (e.g., "Current Hi", "Current Lo") indicating that the current position enroute charts are the respective high-altitude and low-altitude (e.g., or high/low or area, if applicable) enroute charts corresponding to the current position of the aircraft (ownship position), e.g., as determined by positioning systems of the aircraft. For example, the current position enroute charts 306 may be colored or shaded differently from the candidate enroute charts 304 (e.g., magenta vs. cyan) to indicate the different status of the current position enroute charts.

In embodiments, when a current position enroute chart 306 or candidate enroute chart 302 is selected for display by the user, a component panel of the selected enroute chart is displayed (e.g., the active panel). For example, if a candidate enroute chart 302 has been previously selected, the last displayed panel of the selected enroute chart displayed by the display system (100, FIG. 1) remains the active panel, and will be displayed (as the active panel (124, FIG. 1)) when that enroute chart is selected again (as the active enroute chart (122, FIG. 1)). Similarly, the active panel of a current position enroute chart 306 may be the particular panel within the current position enroute chart corresponding to the current position of the ownship, and may update as the ownship position changes relative to the enroute chart and to its component panels (e.g., when the aircraft leaves the coverage area of one enroute chart and enters the coverage area of an adjacent enroute chart).

In embodiments, listings in the main enroute menu 104 for current position enroute charts 306 and candidate enroute charts 302 may include the active panel when this information is available (e.g., H-06 Panel 6, L-04 Panel 5) or many not include the active panel (e.g., L-07, L-09). For example, if additional panels of a current position enroute chart 308 or candidate enroute chart 302 are displayed, the listings for these enroute charts in the main enroute menu 104 may update to indicate the last displayed panel.

In some embodiments, a candidate enroute chart 302 may not have been previously selected. For example, the candidate enroute chart "FAA-WTRS" (302a) may not have an associated active panel, as there is no last displayed panel recognized by the display system 100; the listing for the candidate enroute chart may indicate the absence of an active panel ("Select to choose panel"). When the "FAA-WTRS" candidate enroute chart 302a is selected, the display system 100 may select an active panel for display by software logic if no active panel is otherwise indicated, updating the listing in the main enroute menu 104 to indicate the last displayed panel.

In some embodiments, selection of a current position enroute chart 306 or candidate enroute chart 302 via the main enroute menu 104 may cause the display of a cursor in the panel selector toggle (116, FIG. 1), allowing the selection of an active panel. For example, the listing for the selected current position enroute chart 308 or candidate enroute chart 302 may be updated to indicate the new active panel.

In embodiments, each candidate enroute chart 302 listed by the main enroute menu 104 may include a play button 120 (e.g., play key). Engagement of any play button 120 by the user may cause the display system 100 to display the enroute selection GUI (106, FIG. 1).

Figure 4A:
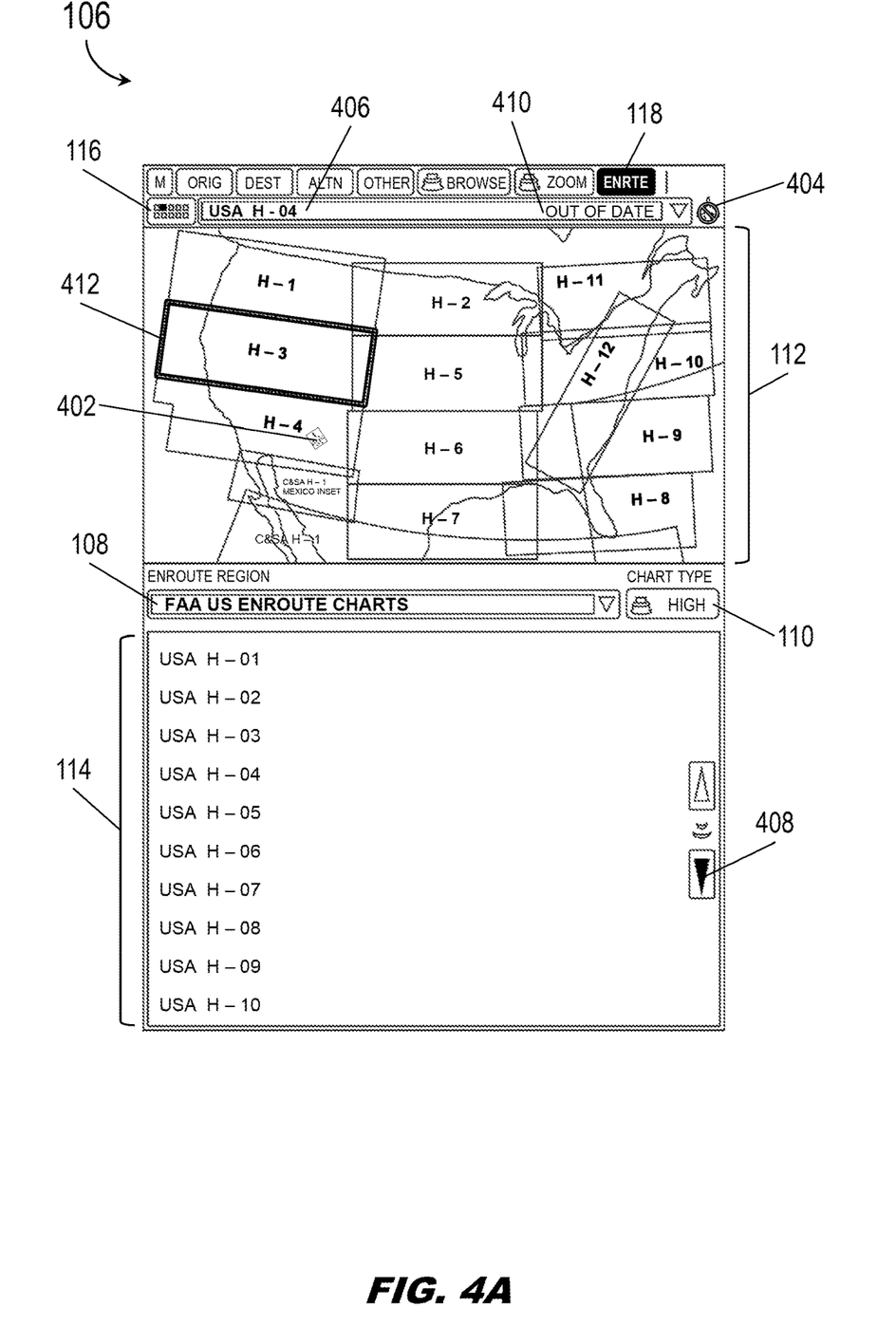
FIGS. 4A through 4C are illustrations respectively of an enroute chart GUI of the display system of FIG. 1, an enroute region selector of the enroute chart GUI of FIG. 4A, and a panel selector display of the display system of FIG. 1.
Figure 4B:
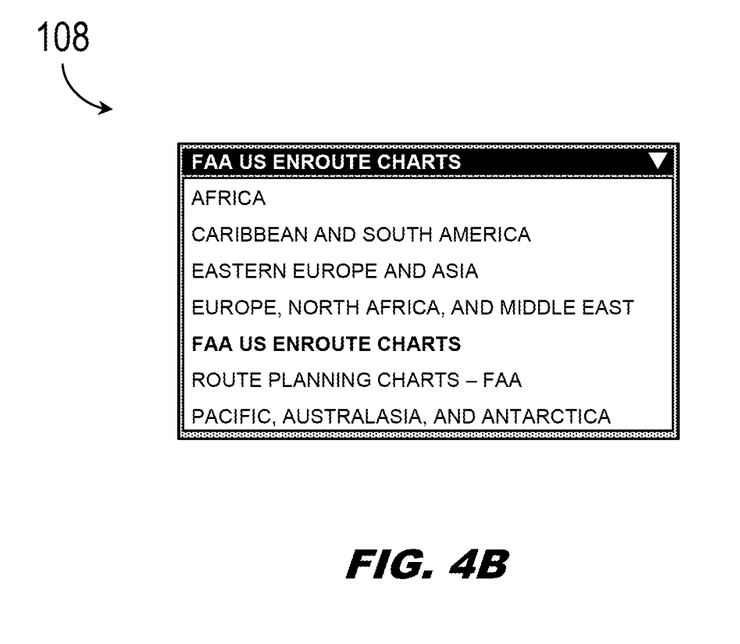
Figure 4C:
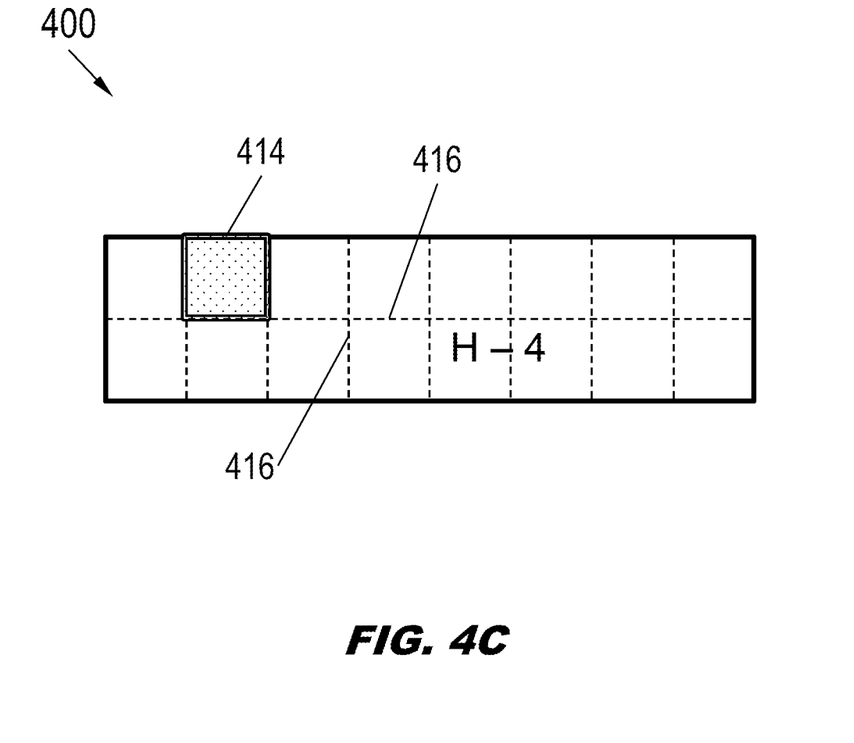

Referring now to FIGS. 4A through 4C, the enroute selection GUI 106, enroute region selector 108, and panel selector display 400 are respectively shown. The enroute selection GUI 106 may include enroute region selector 108, enroute chart type selector 110, chart graphic display 112, chart selection list 114, panel selector toggle 116, enroute selector 118, ownship indicator 402, non-displayable ownship indicator 404, active enroute chart identifier 406, scroll controls 408, and active chart currency indicator 410.

In embodiments, the enroute selection GUI 106 may allow the user to select an enroute region (e.g., via the enroute region selector 108) and a chart type (e.g., via the enroute chart type selector 110). For example, the enroute region selector 108 and enroute chart type selector 110 may be implemented as drop-down menus listing all available enroute regions and all available chart types for a given region (e.g., high, low, hi-lo, area).

In embodiments, the chart graphic display 112 may provide a graphical representation of all available charts for the enroute region selected by the enroute region selector 108 (e.g., FAA enroute charts for the continental United States) of the chart type selected by the enroute chart type selector 110 (e.g., high altitude charts). In some embodiments, the chart graphic display 112 may additionally show other types of charts (e.g., FAA low-altitude charts for the continental United States) in the background. Similarly, the chart selection list 114 may list all available charts for the selected enroute region and chart type. For example, selection of the chart selection list 114 may place a cursor within the chart selection list and activate the scroll controls 408, allowing the user to scroll through the chart selection list and select an enroute chart for display (and designation as the active enroute chart).

In some embodiments, the current position of the aircraft (e.g., ownship position) may be indicated by an ownship indicator 402 within the chart graphic display 112. For example, if the current position of the aircraft is within the enroute region currently selected for display by the chart graphic display 112, the ownship indicator 402 may be superimposed over or otherwise displayed within the chart graphic display 112 to indicate the ownship position as accurately as possible. It should be noted that, due primarily to the scale of the enroute region displayed by the chart graphic display 112, the ownship indicator 402 may be of limited use as a navigational aid but may enhance overall situational awareness.

In some embodiments, the current position of the aircraft may be outside the enroute region selected by the enroute region selector 108 and displayed by the chart graphic display 112, and therefore cannot be represented within the chart graphic display 112. For example, the non-displayable ownship indicator 404 may show that the current position of the aircraft is non-displayable by the chart graphic display 112.

In embodiments, the chart graphic display 112 may allow graphic selection of an active enroute chart in addition to the textual selection provided by the chart selection list 114. For example, the user may (e.g., via cursor, touchscreen, mouse, trackball, or any other appropriate input device) highlight an enroute chart (412) displayed by the chart graphic display 112, e.g., FAA high altitude chart USA H—03. In embodiments, a highlighted enroute chart 412 may be designated as the new active enroute chart (122, FIG. 1) (replacing the previous active enroute chart, if one was designated) and displayed by the display system (100, FIG. 1).

In embodiments, referring in particular to FIG. 4C, when the user engages with the panel selector toggle 116, the panel selector display 400 may be activated (e.g., toggled on) or deactivated/toggled off (e.g., if the panel selector display is currently active). For example, the panel selector display 400 (as described in greater detail by concurrently filed patent application Ser. No. 17/525,130, which application is herein incorporated by reference in its entirety) may display a graphical representation (e.g., thumbnail display) of the active enroute chart 122 (e.g., including a subset of the geographical information set contained within the active enroute chart). In embodiments, the panel selector display 400 may be superimposed over a portion of the displayed active panel 124 of the active enroute chart 122 and may include an active panel indicator 414 indicative of the current active panel (e.g., panel 2). For example, the panel selector display 400 may include dividers 416 (e.g., vertical and/or horizontal) indicative of the division of the active enroute chart 122 into its component panels. In some embodiments, the panel selector display 400 may be rotated through horizontal and vertical orientations. For example, if the displayed active panel 124 is rotated from a horizontal to a vertical orientation (e.g., 90-degree rotation), the panel selector display 400 may likewise rotate 90 degrees (e.g., while maintaining a consistent orientation relative to the displayed active panel. It should be noted that while the active enroute chart 122 and panel selector display 400 are always displayed in rectangular format, the underlying enroute charts may not align perfectly with cardinal directions (e.g., chart H-12, as shown by FIG. 4A).

In some embodiments, the active chart currency indicator 410 may indicate whether the active enroute chart 122 is current or out of date. For example, enroute charts are periodically reissued (e.g., FAA charts are reissued every 56 days), and new enroute charts may or may not include procedural changes relative to their counterpart enroute charts in a previous edition.

Figure 5:
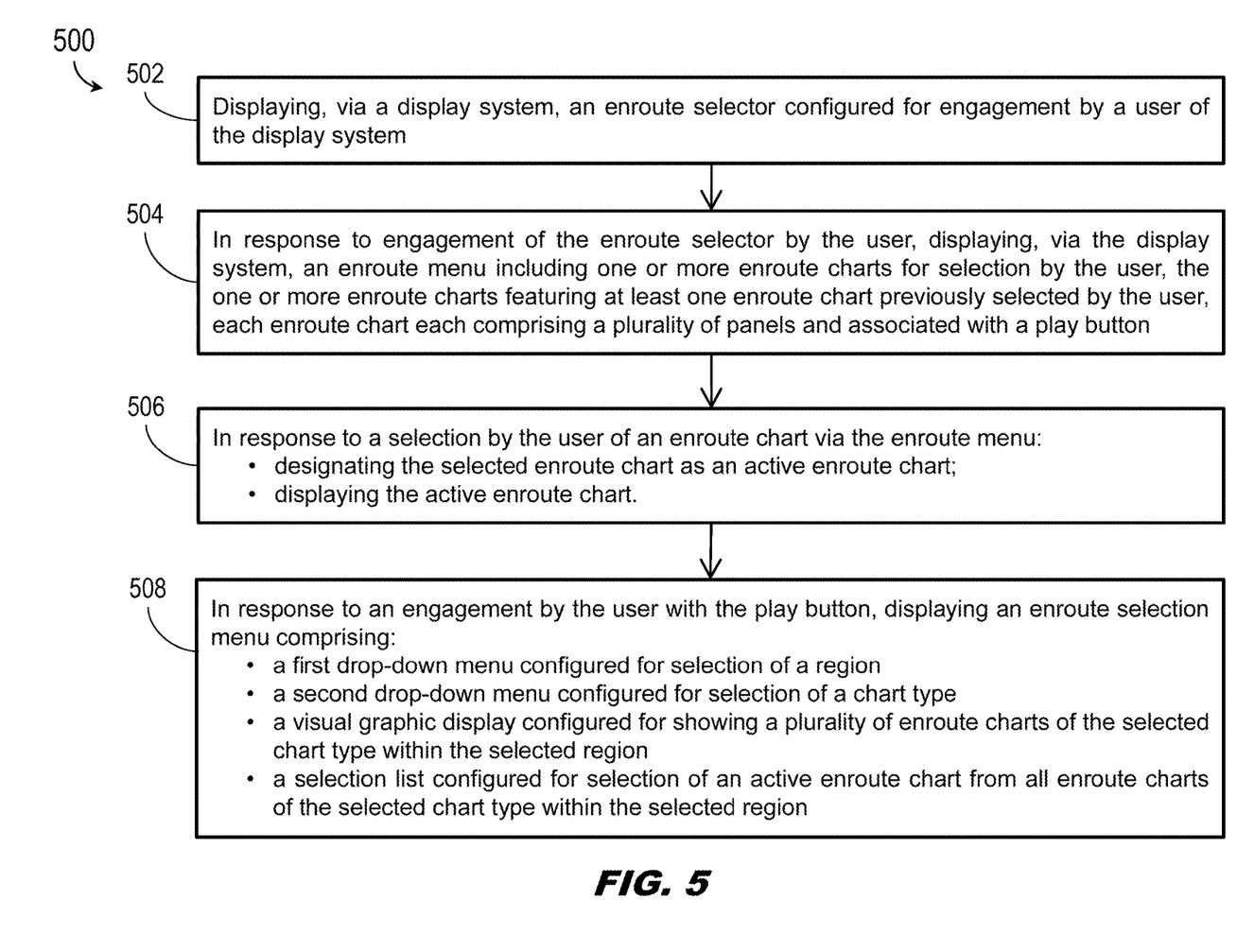
FIG. 5 is a flow diagram illustrating a method for displaying enroute charts via a graphical user interface (GUI) for displaying terminal charts according to example embodiments of this disclosure.

Referring now to FIG. 5, the method 500 may be implemented by embodiments of the aircraft-based display system 100 and may include the following steps.

At a step 502 the display system, within the GUI for displaying terminal charts associated with an airport, displays an enroute selector button with which the user (pilot, operator) may engage for selection and display of enroute charts.

At a step 504, in response to user engagement with the enroute selector button, the display system displays a main enroute menu including enroute charts selectable by the user, each enroute chart comprising a set of component panels. For example, the main enroute menu may include enroute charts previously selected by the user. Each enroute chart listed by the main enroute menu is selectable by the user (e.g., by engaging with the text corresponding to the listed enroute chart) and further includes a play button or key.

At a step 506, in response to user selection of an enroute chart from the main enroute menu, the display system designates the selected enroute chart as the new active enroute chart and displays the selected enroute chart. For example, if the selected enroute chart is a previously displayed enroute chart, the last displayed panel of the selected enroute chart will remain the active panel and will be displayed.

At a step 508, in response to engagement with a play button, the display system displays an enroute selection GUI. For example, the enroute selection GUI includes drop-down menus for selection of an enroute region and a chart type (e.g., high-altitude, low-altitude, high/low, area). Further, the enroute selection GUI includes a selection list for displaying all available enroute charts for the selected enroute region and of the selected chart type, and a chart graphic display for representing the set of available enroute charts graphically.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A display system, comprising:
   a display unit;
   and
   one or more graphics generation processors configured for generation of a graphical user interface (GUI) associated with the display of avionics charts, the GUI configured to cause the display unit to:
   display within the GUI an enroute selector configured for engagement by a user of the display system;
   display, in response to an engagement by the user with the enroute selector, an enroute menu including at least one enroute chart previously selected by the user, each enroute chart associated with a play button and comprising a plurality of panels;
   in response to a selection by the user of an enroute chart from the enroute menu:
      designate the selected enroute chart as an active enroute chart;
      and
      display the active enroute chart;
   in response to an engagement by the user with the play button, display an enroute selection menu comprising:
      a first drop-down menu configured for selection of a region;
      a second drop-down menu configured for selection of a chart type;
      a visual graphic display configured for showing a plurality of enroute charts of the selected chart type within the selected region;
      and
      a selection list configured for selection of an active enroute chart from a set of enroute charts of the selected chart type within the selected region.

2. The display system of claim 1, wherein the display unit is configured to display within the GUI an ownship position relative to the visual graphic display.

3. The display system of claim 1, wherein the display unit is configured to display within the GUI an indicator that an ownship position relative to the visual graphic display cannot be displayed.

4. The display system of claim 1, wherein the enroute selection menu further comprises:
   at least one identifier corresponding to one or more of:
      the active enroute chart;
      or
      an active panel of the active enroute chart.

5. The display system of claim 1, wherein the at least one enroute chart is a candidate enroute chart and the displayed enroute menu comprises at least one current position enroute chart corresponding to a current position of the ownship.

6. The display system of claim 5, wherein the enroute menu includes at least one indicator of a current position active panel associated with each current position enroute chart, the current position active panel corresponding to the current position of the ownship.

7. The display system of claim 1, wherein:
   the enroute menu includes an indicator of an active panel associated with each enroute chart;
   and
   the display unit is configured, in response to the designation of the enroute chart as the active enroute chart, to display within the GUI the active panel associated with the active enroute chart.

8. The display system of claim 7, wherein:
   the active panel includes a most recently displayed panel of the associated enroute chart.

9. The display system of claim 1, wherein:
the one or more enroute charts include at least one non-displayed enroute chart not previously selected for display by the display system;
and
the enroute menu includes an indicator associated with each non-displayed enroute chart, the indicator indicating no active panel associated with the non-displayed enroute chart.

10. The display system of claim 1, wherein the display unit is configured to:
display within the GUI a panel selector toggle configured for engagement by the user;
and
responsive to an engagement by the user with the panel selector toggle, toggle a panel selector display configured for selecting an active panel of the active enroute chart.

11. The display system of claim 10, wherein the panel selector display is superimposed over the currently displayed active enroute chart and comprises one or more of:
a thumbnail display of the active enroute chart divided into its corresponding plurality of panels;
and
an active panel indicator corresponding to the active panel of the active enroute chart.

12. The display system of claim 1, wherein the display unit is configured to:
accept control input from the user via the visual graphic display, the control input configured for selection of the active enroute chart;
and
responsive to the control input, at least one of 1) highlight within the visual graphic display the enroute chart corresponding to the control input or 2) select as the active enroute chart the enroute chart corresponding to the control input.

13. The display system of claim 12, wherein the display unit includes a touchscreen surface configured for accepting the control input.

14. The display system of claim 1, wherein the selection list includes one or more scroll controls and a cursor configured for selection of the active enroute chart.

15. The display system of claim 1, wherein the enroute selection menu includes an indicator corresponding to a currency of the displayed active enroute chart.

16. The display system of claim 1, wherein the display system is embodied in one of an aircraft-based primary flight display (PFD) or an aircraft-based navigational display.

17. The display system of claim 1, wherein the display system is embodied in an electronic flight bag (EFB).

18. A method for selection and display of enroute charts via a graphical user interface (GUI) for displaying avionics charts, the method comprising:
displaying, via a display system and within a GUI associated with the display of avionics charts, an enroute selector configured for engagement by a user of the display system;
in response to an engagement of the enroute selector by the user, displaying within the GUI an enroute menu including one or more enroute charts for selection by the user, the one or more enroute charts featuring at least one enroute chart previously selected by the user, each enroute chart comprising a plurality of panels and associated with a play button;
in response to a selection, by the user, of an enroute chart via the enroute menu:
designating the selected enroute chart as an active enroute chart;
and
displaying the active enroute chart;
and
in response to an engagement by the user with the play button, displaying within the GUI an enroute selection menu comprising:
a first drop-down menu configured for selection of a region;
a second drop-down menu configured for selection of a chart type;
a visual graphic display configured for showing a plurality of enroute charts of the selected chart type within the selected region;
and
a selection list configured for selection of an active enroute chart from a set of enroute charts of the selected chart type within the selected region.

19. The method of claim 18, wherein displaying within the GUI an enroute selection menu comprising a visual graphic display configured for showing a plurality of enroute charts of the selected chart type within the selected region includes:
displaying within the GUI an ownship position relative to the visual graphic display.

20. The method of claim 18, wherein displaying within the GUI an enroute selection menu comprising a visual graphic display configured for showing a plurality of enroute charts of the selected chart type within the selected region includes:
displaying within the GUI an indicator that an ownship position relative to the visual graphic display cannot be displayed.

* * * * *